United States Patent [19]

Lagunilla-Leca

[11] 4,051,836
[45] Oct. 4, 1977

[54] DOUBLE-WALLED COVER FOR COOKING FOOD

[76] Inventor: Carlos Lagunilla-Leca, Francisco del Paso y Troncoso No. 324B6, Unidad Kennedy, 9 Mexico City, Mexico

[21] Appl. No.: 650,208

[22] Filed: Jan. 19, 1976

Related U.S. Application Data

[63] Continuation-in-part of Ser. No. 526,341, Nov. 22, 1974, abandoned.

[30] Foreign Application Priority Data

Dec. 5, 1973 Mexico ................................ 147878

[51] Int. Cl.² .............................................. A21B 1/52
[52] U.S. Cl. ............................................. 126/275 R
[58] Field of Search ................... 126/275, 30, 29, 333

[56] References Cited

U.S. PATENT DOCUMENTS 1,105,178   7/1914   Boger ............................. 126/275 R

FOREIGN PATENT DOCUMENTS 42,062    4/1930   Denmark ....................... 126/275 R
552,692  12/1956   Italy ................................ 126/275 R
208,330   1/1940   Switzerland ................... 126/275 R Primary Examiner—William O'Dea
Assistant Examiner—Harold Joyce
Attorney, Agent, or Firm—Ladas, Parry, Von Gehr, Goldsmith & Deschamps

[57] ABSTRACT

A cover having the form of a bell with double wall and space between the walls, for maintaining the cooking temperature of food, which is placed over a burner of a kitchen stove or the like and which prevents the hot air from escaping from the vicinity of the burner, forming a first chamber which maintains a substantially uniform temperature therewithin and with a second enveloping chamber formed by the double wall, which also admits hot air around the lower edge passing into the space between inner and outer wall thus increasing the efficiency of the conservation of heat within the inner chamber, which permits rapid cooking of the food with the use of less fuel or heat.

1 Claim, 4 Drawing Figures

U.S. Patent   Oct. 4, 1977   Sheet 1 of 2   4,051,836

DOUBLE-WALLED COVER FOR COOKING FOOD

CROSS-REFERENCES TO RELATED APPLICATIONS

This application is a Continuation in Part of U.S. patent application Ser. No. 526,341 filed on Nov. 22, 1974 now abandoned.

BACKGROUND OF THE INVENTION

This invention relates to apparatus for cooking foods, and more particularly concerns a cover having a double wall and a space between said walls which provides a double chamber to prevent radiant heat and hot air from escaping from the vicinity of a burner, saving fuel and reducing the cooking time for the food.

Up to the pesent time and according to the references cited in the first examination to which patent application Ser. No. 526,341 was subjected, of which application the present is a Continuation in Part, there exists a plurality of food cooking apparatus with covers. Nevertheless, none of them includes a cover having a double wall and a space between the two covers and open on the lower edge to admit hot air into the said space, either directly from the burner or from within the vessel being heated, or from the plate placed over the burner or heat element.

SUMMARY OF THE INVENTION

It is an object of this invention to provide a movable double-walled cover which can readily be placed over a burner or heat element.

Another object of the invention is to provide a double-walled cover for cooking any type of food, whether it is placed within a vessel or upon a grill placed on a metallic plate positioned directly over a burner or any other heat source.

The double-walled cover of this invention for cooking food is composed of a double wall in bell shape having certain spacers distributed between the two covers to form a chamber between them open at its lower end, through which hot air is admitted directly from the burner or heat source, or alternatively from the vessel containing the food being cooked or from a metallic plate placed directly over the burner. This double-walled cover includes at the top of the outer wall a knob for removing or placing the double-walled cover over the vessel containing the food or directly over the food placed on the grill set on a metal plate over the burner. In the absence of a grate or supports for the metallic plate, a grill or an additional rack can be placed directly over the flame.

In one embodiment of this invention, the lid of the vessel for cooking the food can be secured to the upper inside portion of the double-walled cover, so that when the double-walled cover is raised the vessel is also uncovered and vice versa. This disposition increases the efficiency of the cover by preventing the escape of hot air. The double cover may of course include an insulating layer, which preferably would be on the outside face of the walls to permit cleaning the inside of the cover easily; alternatively each one of the walls may be composed of a three-layers sandwich of which the intermediate layer is thermally insulating and the outer layers are metallic or any similar arrangement.

These and other objects to be attained through the application of this invention will be more fully understood and appreciated through the reading of the following description which refers to the accompanying drawings of the preferred embodiment of the invention.

DETAILED DESCRIPTION OF THE INVENTION

Figure 1:
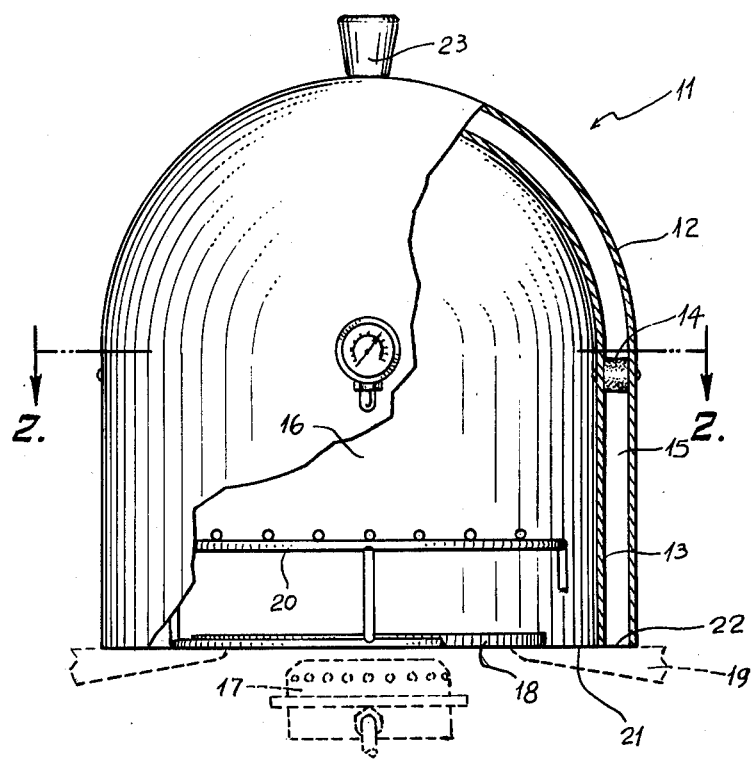
FIG. 1 is a vertical elevational view with a detail section of one embodiment of the double-walled cover of the present invention.
Figure 2:
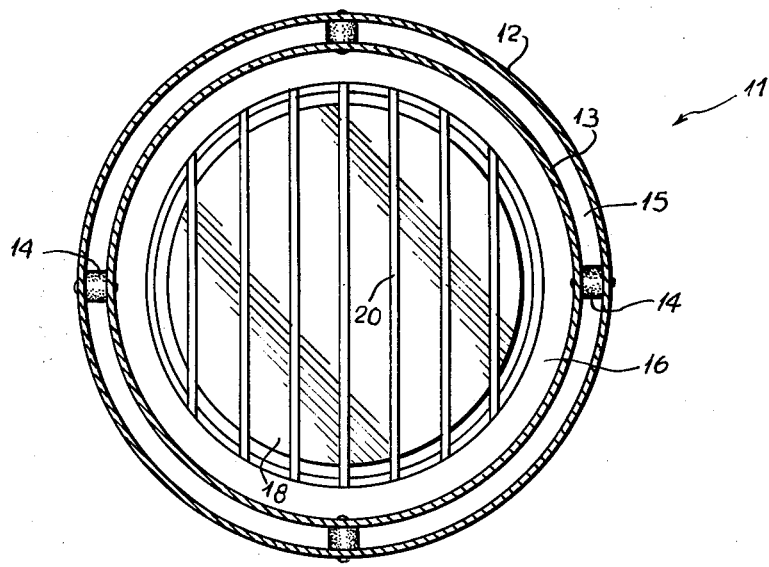
FIG. 2 is a cross-sectional view along 2—2 of FIG. 1, showing the possibility of including a grill for braising foods.

The cover for cooking food of the present invention 11 is composed of an outer wall 12 and an inner wall 13, separated by spacers 14 at such a distance as to define an outer chamber 15 and an inner chamber 16 open at their lower edge and which prevent the hot air from escaping from the vicinity of a burner 17, which is able to heat directly a vessel containing foods or to heat a metallic plate 18 placed over the grating 19 of burner 17, which can be that of a domestic stove or the like having a grill 20 placed upon said metallic plate 18 for braising meat. Because the hot air tends to rise, the air escaping from the inner chamber 16 around its lower edge 21 as well as the hot air coming from heated metal plate 18 is admitted through opening 22 into the inside of chamber 15 formed between the two walls 12 and 13 of cover 11. When external chamber 15 is full of hot air, the escape of hot air from inner chamber 16 away from cover 11 is more efficiently impeded, so that the food placed inside the cover can cook more easily and rapidly, with consumption of only a small amount of fuel which is considerably less than that required for cooking the food without cover 11.

In addition, because of the thermally insulating action of the cover, the user can approach the place where the foods are being cooked without the discomfort of undesirable high temperatures.

For the manipulation of the cover a knob 23 is provided so the user can put on or take off the cover at will. Walls 12 and 13 may be made simply of metal sheet as illustrated in FIG. 1, or alternatively they may include a layer 24 of thermal insulation as illustrated in FIG. 3, which preferably is applied to the outer side of the walls in order to permit cleaning the inside of cover 11 easily.

Figure 4:
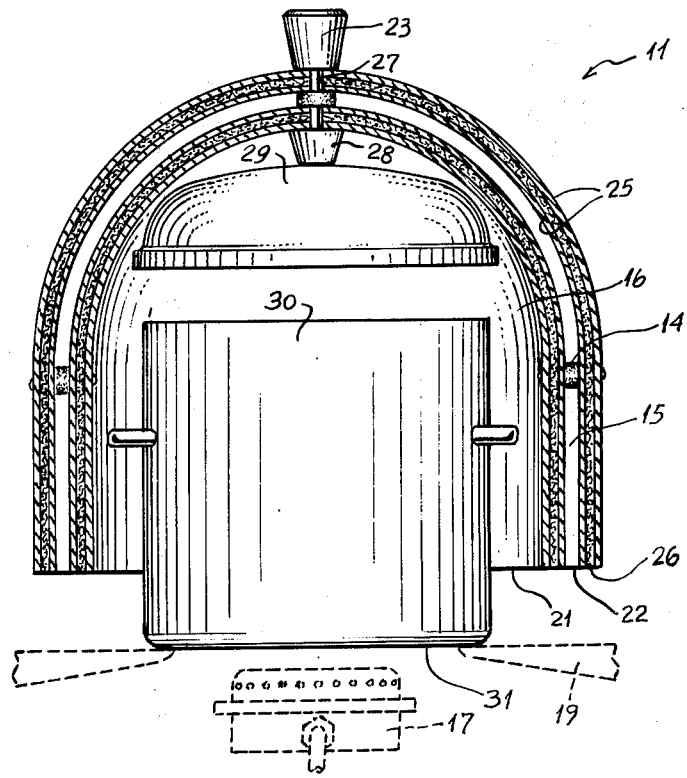
FIG. 4 is a view similar to that of FIG. 3, with the kettle lid removed, and wherein each wall consists of a sandwich with a metallic double wall having an intermediate insulating layer.

Alternatively each of the walls of cover 11 may as illustrated in FIG. 4 be composed of a sandwich of three layers, two external metallic layers 25 and one intermediate insulating layer 26.

These different possibilities for construction of the walls of the cover are illustrated as an example to indicate that selection may be made of any one of these dispositions of layers. The important point in this double cover consists in that the space between walls 12 and 13 should be open at the bottom 22 of cover 11.

Figure 3:
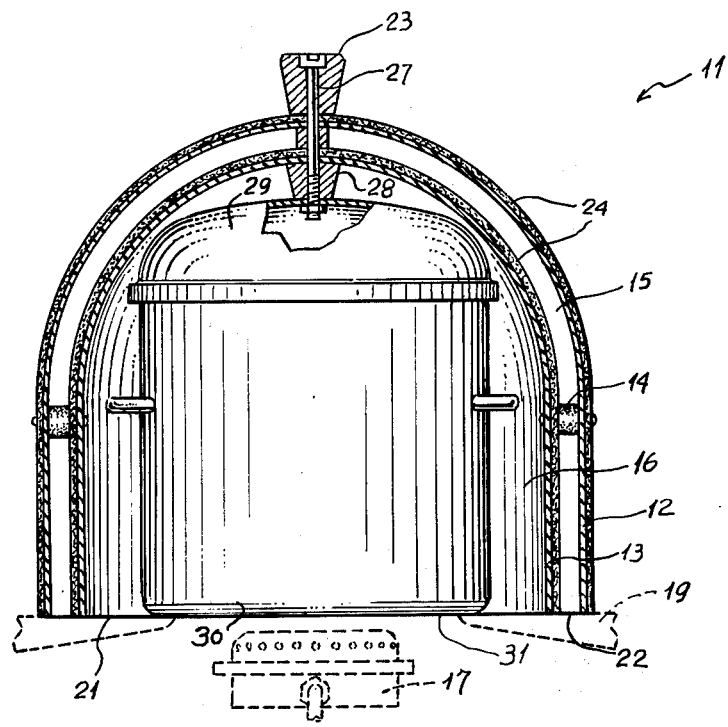
FIG. 3 is a conventional longitudinal sectional view of an embodiment of the invention in which the double-walled cover is secured at its top to the lid of a kettle, each wall having an insulating layer.

In FIGS. 3 and 4 an embodiment of the cover 11 of the invention is illustrated in which the said cover 11 may be attached by means of a screw 27 and an adapter 28 to lid 29 of kettle 30, in such a fashion that the lower edges 21 of the cover 11 stay at the same level as the bottom wall 31 of kettle 30. Screw 27 may be the same one which secures knob 23 for manipulating the cover.

In the foregoing embodiment, cover 11 is joined to kettle lid 29, whereby when the user has occasion to inspect the food contained in the kettle, the hot air contained inside chamber 16 is not entirely lost, and furthermore the user does not need to remove cover 11 first and then lid 19 to the kettle 30, but does it all in one move, conserving part of the accumulated heat.

While the foregoing description is drawn to a preferred embodiment of the invention, it will be understood by all persons skilled in the subject matter that any changes in form and detail are included in the spirit and scope of the present invention.

What I claim is:

1. A cover having a double wall for cooking food which is placed over a burner comprising an outer wall in the shape of a bell, a manipulation knob located on said outer wall, an inner wall in the shape of a bell, a plurality of spacers located between said outer wall and said inner wall to secure said walls together in spaced relation, a first chamber for conserving the heat emanating from said burner defined by said inner wall which is open at its lower end only, and a second chamber substantially surrounding said first chamber defined by said inner and outer walls which is open at its lower end only to admit hot air thereinto, the first chamber being in direct communication with heat rising upwardly from said burner, and each of said walls of the cover including a metallic layer with a thermal insulating layer, each of the walls of the cover including three layers, the intermediate layer being thermally insulating and the two outer layers being metallic, and a kettle and a lid therefor, an adapter secured to the upper inside portion of said cover and the top of said lid to secure said lid to said cover, the lower edges of said cover being at the same level as the bottom of said kettle when resting upon a grate placed upon said burner which supports said cover and said kettle.

* * * * *